United States Patent [19]

Fasano et al.

[11] Patent Number: 4,745,501
[45] Date of Patent: May 17, 1988

[54] THERMAL ISOLATION OF THE VOICE COIL MOTOR FROM BASE PLATE AND CARRIAGE GUIDE RAILS OF A DISC DRIVE

[75] Inventors: Ronald F. Fasano, Santa Clara County; Michael K. Andrews, Santa Cruz County, both of Calif.

[73] Assignee: Seagate Technology, Scotts Valley, Calif.

[21] Appl. No.: 800,058

[22] Filed: Nov. 20, 1985

[51] Int. Cl.[4] .......................... G11B 5/55; G11B 21/20
[52] U.S. Cl. ...................................... 360/97; 360/106; 360/109
[58] Field of Search ................................ 360/104–105, 360/106, 109, 97–99

[56] References Cited

U.S. PATENT DOCUMENTS 4,553,183  11/1985  Brown et al. ..................... 360/97 X

*Primary Examiner*—John H. Wolff
*Attorney, Agent, or Firm*—Flehr, Hohbach, Test, Albritton & Herbert

[57] ABSTRACT

A disc drive is disclosed including a base that includes a first section for mounting the motor that supports and spins the discs, and a second section for mounting the actuator and the carriage which is to carry the transducers toward and away from the discs. The voice coil motor itself consists of two halves. Each half is mounted to the base using a flange located between the carriage guide rods on which the carriage will ride. This mounting flange has two attachment points: a first mounting point at the end of the flange farthest from the discs, which is fixed in all axes, and a second mounting point at the end of the flange closest to the discs, which prevents relative movement between the base and the voice coil motor in the axes perpendicular to and tangential to the discs, but allows differential expansion along the axis radial to the discs. Since each voice coil motor half is independently mounted to the base, and since each motor half has only one fixed mounting point along any one axis, the base is free to thermally expand and contract around the voice coil motor without distorting.

10 Claims, 3 Drawing Sheets

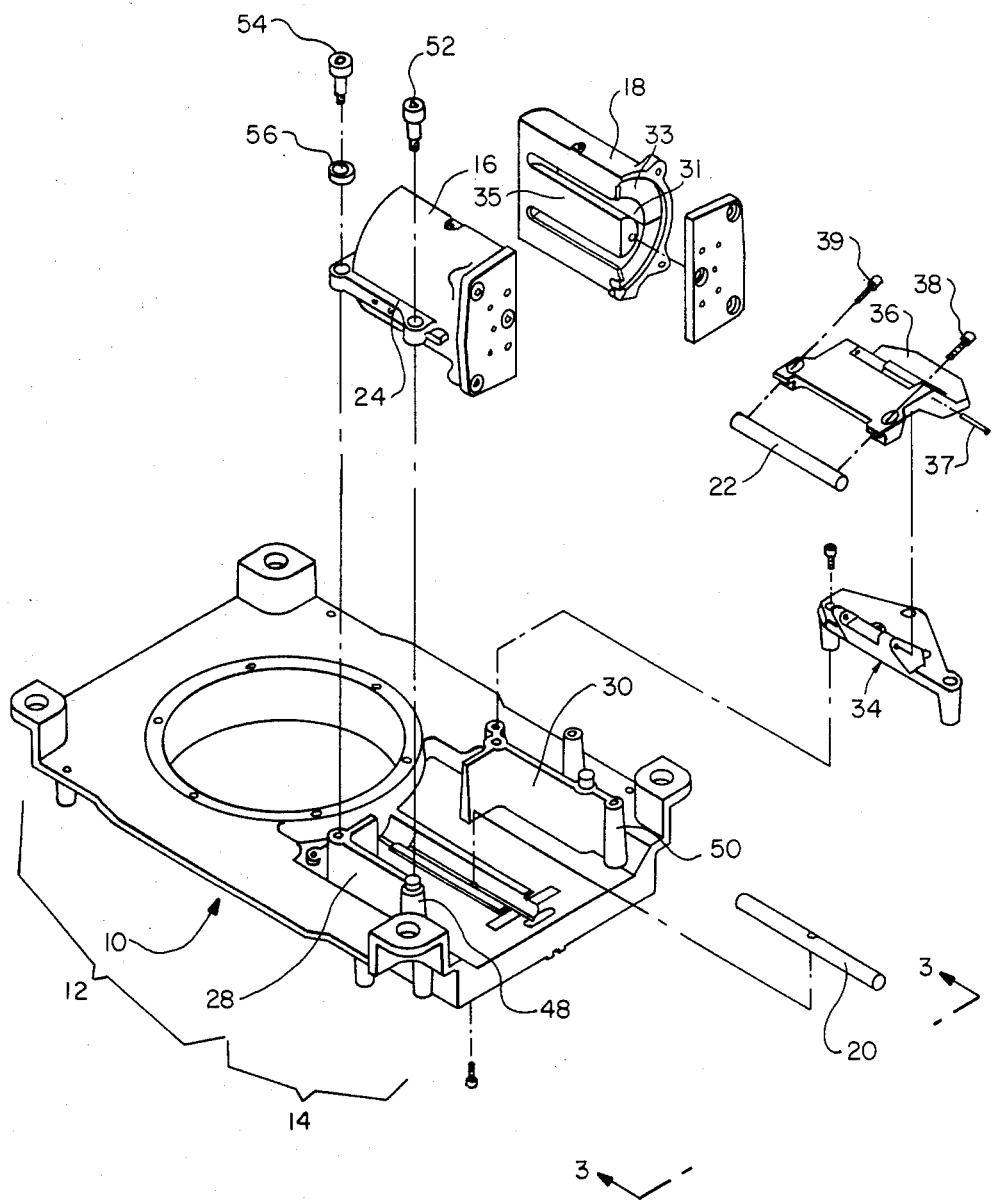
FIG.—1

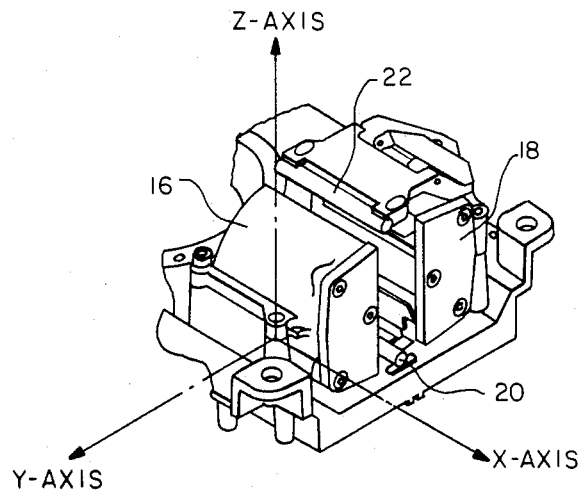
FIG.—2
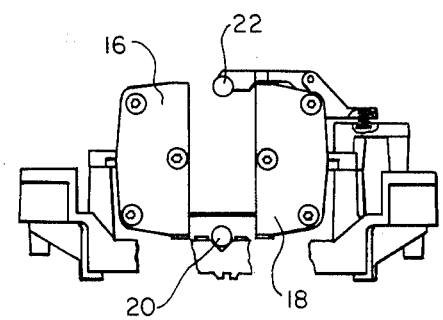
FIG.—3
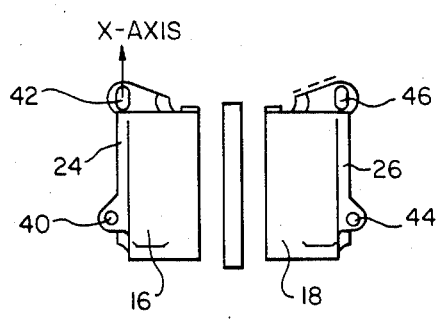
FIG.—4
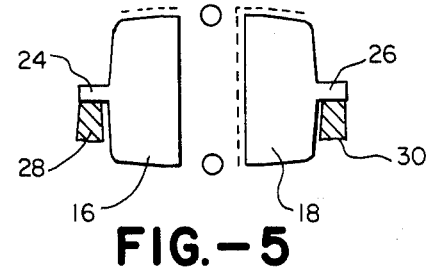
FIG.—5
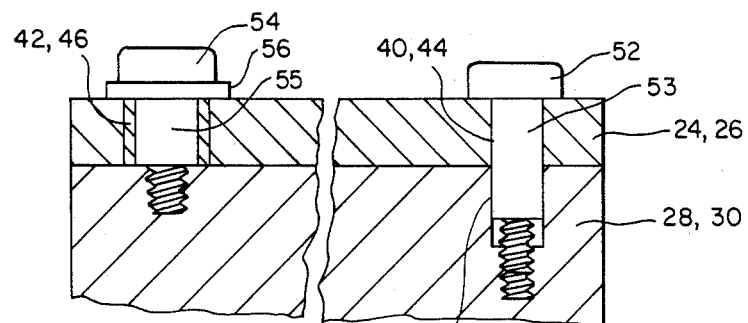
FIG.—6

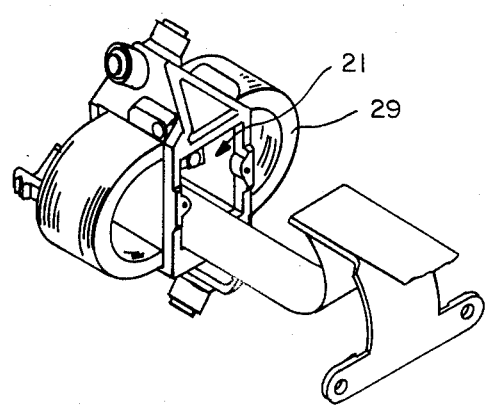
FIG.—7A
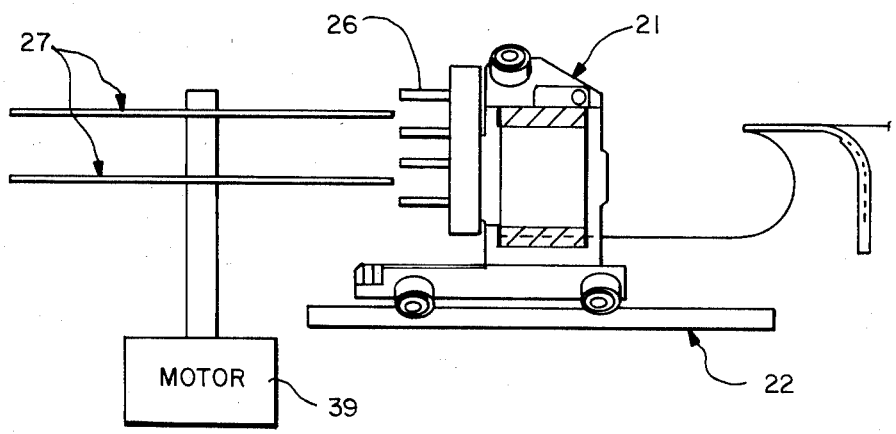
FIG.—7B

THERMAL ISOLATION OF THE VOICE COIL MOTOR FROM BASE PLATE AND CARRIAGE GUIDE RAILS OF A DISC DRIVE

This invention relates generally to memory storage apparatus, and more particularly to an improved disc drive memory storage apparatus having a linear voice coil actuator for reciprocatably positioning a transducer array relative to a discs on which information is recorded. The actuator is referred to as a linear actuator because it is adapted to move the transducer array along a straight radial line relative to the media or discs of the storage apparatus.

Disc drive machines record and reproduce information stored on concentric circular tracks recorded on magnetic discs or equivalent media. The tracks are written and read by a transducers which cooperate with the surfaces of the discs. The need for a more compact, high capacity magnetic disc memory storage apparatus has generated much interest in recent years in the Winchester type of disc drive device. Due to the increased track density made possible by continuing research, there has been an ongoing attempt to provide an actuator capable of extremely rapid access time which is also compact. Linear voice coil actuators are themselves well known in disc drive technology. Generally, they include a carriage which is reciprocatably guided between a pair of guide rails with the data accessing transducers, which are to cooperate with the discs, being mounted to the inner end of the carriage. The voice coil motor which drives the carriage is frequently split into two symmetrical portions disposed on either side of the centerline of the carriage to apply forces to the carriage generally along parallel lines to drive the carriage toward and away from the discs. The actuator is typically situated adjacent the peripheries of several vertically spaced discs and is designed to rapidly position the transducers to access recorded disc information. The transducers normally comprise floating read/write heads for reading and recording information on the tracks of the disc. Though the present invention is to be described as used in a Winchester disc drive unit, it will be appreciated that the actuator will be useful in other types of electromechanical memory storage apparatus such as where an optical transducer or several optical transducers are incorporated in the actuator.

It is readily apparent that due to the extremely high track density on the discs, the design of such a high performance disc drive requires extensive consideration to be given to the thermal characteristics of the design. Especially critical to the design of the assembly are material selection, parts design, attachment techniques, heat sources and heat dissipation. All of these must be taken into account in a complete thermal analysis. The objective of such an analysis is to minimize positional changes between the heads and discs which can occur due to temperature changes.

Thermal changes occur due to the typically specified operating environment which may vary from 10° C. to 50° C. or from 50° F. to 122° F. In other words, the drive must be capable of writing information at any temperature within the specified range, and reading that information at any other temperature within the specified range, even though the drive components have expanded or contracted at different rates. Non-uniform heat sources may have created thermally induced changes which cause parts to distort and change their shape.

Therefore, it is an objective of the present invention to provide a disc drive design which improves positional accuracy between the read/write heads and the discs over a specified operating temperature range.

Another objective of this invention is to provide an improved design for a linear voice coil actuator wherein the carriage and the carriage guide rods on which the carriage moves are isolated from any thermal distortions which may occur due to differences in materials.

Yet another objective of this invention is to provide a disc drive in which the relative alignment of the discs and carriage are maintained despite operations over a broad range of temperatures.

Another objective of this invention is to allow for differential thermal expansion, in all axes, of the acuator voice coil motor and the carriage guide rod/disc support structure.

This thermal accomodation is accomplished in a disc drive including a base which includes a first section for mounting the motor which supports and spins the discs, and a second section for mounting the actuator and the carriage which is to carry the transducers toward and away from the discs. The voice coil motor itself consists of two halves. Since the voice coil motor poles are made from low carbon steel and are mounted to an aluminum base plate which has a thermal coefficient of expansion about 50% greater than that of low carbon steel, it is essential that any differential expansion of the voice coil motor and base occur without distorting the base and the carriage guide rods which are mounted on the base.

In order to achieve the objectives of this invention, each voice coil motor half is mounted to the base using a flange which is located between the carriage guide rods on which the carriage will ride. This mounting flange has two attachment points: a first mounting point at the end of the flange furthest from the discs, which is fixed in all axes, and; a second mounting point at the end of the flange closest to the discs, which prevents relative movement between the base and the voice coil motor in the axes perpendicular to and tangential to the discs, but allows differential expansion along the axis radial to the discs. Since each voice coil motor half is independently mounted to the base, and since each motor half has only one fixed mounting point along any one axis, the base is free to thermally expand and contract around the voice coil motor without distorting.

Additionally, the carriage guide rods which support the moveable carriage must be maintained in precision alignment both with each other and relative to the discs. This is accomplished by mounting the lower carriage guide rod directly to the base with a single screw or other appropriate fastener, and mounting the upper carriage guide rod in a structure made of the same material as the base. Since the carriage guide rods, like the voice coil motor pole pieces, are steel for durability, differential expansion between the carriage guide rods and their support structures is allowed without affecting their positions relative to each other or the discs.

In summary, this motor mounting concept is capable of operating within the specified thermal environment without affecting the critical location of the carriage support rods or causing distortion of the base.

The details of this invention and its objectives and advantages will be better understood with reference to the following figures, wherein FIG. 1 is an exploded perspective view of the base plate, voice coil motor halves, carriage guide rods and carriage guide rod mounting means of this invention;

FIG. 2 is an assembled perspective view of the components of FIG. 1 and defines the x, y and z axes to which further discussion will refer;

FIG. 3 is an elevational view of the voice coil motor assembly as seen looking toward the discs showing a portion of the housing, the carriage guide rods and the carriage guide rod support structure;

FIG. 4 is a plan view of the voice coil motor halves and their mounting flanges;

FIG. 5 is a simplified elevational view of the voice coil motor showing the mounting scheme; and FIG. 6 is a sectional view of the mounting means, showing the preferred embodiment.

FIGS. 7A and 7B are perspective and side elevation views of the carriage of this invention showing the carriage for the transducers, the coil, the PCC cable and the support bracket for the PCC.

Referring now to the figures of this application, wherein like elements are assigned like reference numbers, a magnetic disc memory apparatus is shown including a base 10 having a first region 12 for mounting and rotatably supporting a plurality of discs, and a second region 14 for mounting a linear actuator for concurrently moving several accessing transducers along a linear path that extends generally radially of the rotating discs. In particular, in this preferred embodiment, the apparatus is a Winchester disc drive that includes fixed discs of 5.25" diameter with an intended high track density.

Memory disc type storage apparatus such as this, which includes a linear actuator, is well known by those of skill in the art. The base 10 in such disc drives forms part of a closed housing that includes a filtration system adapted to keep the disc surfaces free of contaminants. The carriage itself is described in the application of Wiens, Pollard and Weinberg entitled, "A Lightweight, Rigid, Compact Configuration for the Voice Coil, Carriage and Printed Circuit Cable in a Disc Drive," Ser. No. 800,059, filed Nov. 20, 1985 and assigned to the Assignee of this invention, and incorporated herein by reference.

The voice coil motor for driving the carriage comprises a pair of halves 16, 18 which are symmetrically mounted about the area where the carriage guide rods 20, 22 are mounted.

The carriage 21 is mounted to roll back and forth along the upper and lower rails 20, 22 to position the transducer carrying arms 25 relative to the rotating magnetic discs 27. The positioning action is controlled by the voice coil motor which comprises separate magnetic sections 16, 18 which cooperate with a coil 29 carried on the carriage 21. The coil 29 passes through the slots 31 defined between the magnet section 33 and the shorted turn 35 of each motor section 16, 18. The motor sections 16, 18 are supported on a housing 35 which also supports a motor 39 which rotates the discs 29 at a constant speed while the carriage positions the transducers carried on arms 25 at selected positions relative to the disc surface. Each motor section includes a flange 24, 26. Each flange rests on a raised mounting surface 28, 30 which is a part of the base casting 10. This feature of the invention is especially clear from the view in FIG. 5. It is apparent that because of this mounting scheme, each motor half is free to move independently of the other in the y and z axes. Since no structural member limits the movement of these motor halves in these axes, there is no tendency for the base 10 to become distorted with differential thermal expansion of the motor halves and the base 10. This is significant because the coefficient of expansion of the motor halves or sections 16, 18 is significantly different from the coefficient of expansion of the material of the base casting 10. The carriage guide rods themselves are not mounted to the voice coil motor. Instead of being mounted directly to the voice coil motor, the lower carriage guide rod 20 rests on and is fastenened to the base casting 10. The upper carriage guide rod 22 is cantilevered over the voice coil motor using a preload mounting bracket 34 and preload arm 36 made of the same material as the base 10, with the assembly being coupled together using pivot pins 37, and screws 38, 39.

To allow free and non-distorting differential thermal expansion along the x axis (as defined in FIG. 2), a unique mounting system is provided for coupling each voice coil motor half 16, 18 by its flange 24, 26 to the raised mounting surface 28, 30 of the base 10. More particularly, each flange includes a pair of holes 40, 42 on the left hand flange 24 and 44, 46 on the right hand flange 26. In the preferred embodiment rear mounting openings 40, 44 are circular and are adapted to receive a precision shoulder screw 52. As can best be seen in FIG. 6, the shoulder 53 of this shoulder screw 52 passes through this rear circular hole 40, 44 and into corresponding precision alignment holes 48 or 50 in the raised mounting surfaces 28, 30. As is evident in FIG. 6, neither the shoulder portion 53 nor the threaded portion of the shoulder screw 52 bottoms out. Thus, when the shoulder screw 52 is tightened, the rear of the mounting flange 24, 26 is fixed to the raised mounting surface 28, 30 of the aluminum base 10 in all axes. The front portion of the mounting flange 24, 26 is restrained by a precision shoulder screw 54 which passes through a resilient washer 56 and a flange slot 42 or 46 which extends along the x axis. FIG. 6 shows that the shoulder 55 of this shoulder screw 54 is stopped at the surface of the raised mounting surfaces 28, 30 partially compressing the resilient washer 56. This slot and shoulder screw arrangement limits any motion in the y and z axes but permits relative motion between the flanges 24, 26 of the voice coil motor halves and the aluminum base 10 in the x direction. Such motion may occur due to differential thermal expansion between the steel voice coil motor and the aluminum base.

In summary, this voice coil motor mounting method is capable of allowing for significant changes in the thermal environment without affecting critical location of the carriage supports which are mounted to the base structure, and thereby without affecting the accuracy of positioning the carriage relative to the discs.

Alternatives of the present invention may become apparent to a person of skill in the art who studies the present invention disclosure. Therefore, the present invention is to be limited only by the following claims.

What is claimed is:

1. In a disc drive including at least one disc and an actuator means for moving a transducer relative to the disc comprising a housing including a base plate, said base plate comprising a first region for rotatably mounting discs and a second region for mounting a voice coil motor for moving a carriage supporting read/write transducers along a pair of carriage guide rods radially relative to the disc, said voice coil motor comprising first and second sections divided along a plane radial to the disc, said base plate including a pair of raised mounting surfaces for supporting said voice coil motor sections, means for coupling said voice coil motor sections to said raised mounting surfaces of the base in a way to allow relative thermal expansion and contraction of said voice coil motor sections and said base along an axis parallel to said radial plane and parallel to the surfaces of said discs, and along two other axes, one being perpendicular to said discs and the other being parallel to a tangent to said discs and perpendicular to the other two said axes without causing distortion of said base or relative displacement of said carriage guide rods, said means providing only one fixed attachment in each of said axes.

2. A disc drive as claimed in claim 1 wherein the outer surface of said voice coil motor sections includes a pair of flanges extending out to rest on said raised mounting surfaces, said raised mounting surfaces being separated from each other in a direction generally along an axis perpendicular to said radial plane to allow relative thermal expansion and contraction of said voice coil motor sections and said base along said axis.

3. A disc drive as claimed in claim 2 including a pair of mounting holes in each of said flanges for attaching said voice coil motor sections to said raised mounting surfaces.

4. A disc drive as claimed in claim 3 including openings in each of said raised mounting surfaces corresponding to the openings in said flanges, in each raised mounting surface at least one of the openings being generally in that portion of the raised mounting surface distant from the discs, the other opening being generally in that portion of the raised mounting surface toward the discs.

5. A disc drive as claimed in claim 3 wherein at least one of the mounting holes in each of the flanges comprises a slot extending in an axis parallel to said radial plane and parallel with the surfaces of said discs.

6. A disc drive as claimed in claim 5 wherein said slotted mounting hole is located either in that portion of said flange most closely adjacent to said discs, or in that portion of the flange most distant from said discs.

7. A disc drive as claimed in claim 6 wherein the other of said mounting holes in each flange is located generally in that portion of the flange distant from said slot.

8. A disc drive as claimed in claim 5 including screws having shoulder portions inserted in each of said mounting holes and raised mounting surface holes for fastening said voice coil motor sections to the raised mounting surfaces.

9. A disc drive as claimed in claim 5 including means for mounting said carriage for movement between said voice coil motor sections toward and away from said disc comprising a pair of carriage guide rods extending between said voice coil motor sections along the radial plane dividing the sections.

10. A disc drive as claimed in claim 9 wherein the lower of said carriage guide rods rests on and is fastened to the baseplate of the housing; the upper of the carriage guide rods being carried on a preload arm cantilevered over said voice coil motor to thermally isolate said carriage guide rod from said voice coil motor.

* * * * *